United States Patent
Ravatin et al.

(10) Patent No.: US 6,816,006 B2
(45) Date of Patent: Nov. 9, 2004

(54) METHOD OF ADJUSTING THE CUTOFF FREQUENCY OF AN ELECTRONIC FILTERING SYSTEM, AND CORRESPONDING SYSTEM

(75) Inventors: Jean Ravatin, Moirans (FR); Michel Mouret, Jarrie (FR); Francois Van Zanten, Meylan (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 10/360,833

(22) Filed: Feb. 7, 2003

(65) Prior Publication Data

US 2003/0186658 A1 Oct. 2, 2003

(30) Foreign Application Priority Data

Feb. 7, 2002 (FR) .............................. 02 01516

(51) Int. Cl.[7] .............................. H03B 1/00; H03K 5/00; H04B 1/10
(52) U.S. Cl. ....................... 327/553; 327/558
(58) Field of Search .................. 327/553, 554, 327/556–559

(56) References Cited

U.S. PATENT DOCUMENTS

| 5,625,317 A | | 4/1997 | Deveirman ................. 327/353 |
| 5,914,633 A | * | 6/1999 | Comino et al. ............. 327/553 |
| 6,429,733 B1 | * | 8/2002 | Pagliolo et al. ............. 327/552 |

* cited by examiner

Primary Examiner—Terry D. Cunningham
Assistant Examiner—Quan Tra
(74) Attorney, Agent, or Firm—Lisa K. Jorgenson; Allen, Dyer, Doppelt, Milbrath & Gilchrist, P.A.

(57) ABSTRACT

The method includes an adjustment phase in which a filtering device is operated as an oscillator, the frequency of oscillation of the filtering device is determined, and the characteristics of the filtering device are corrected with respect to the determined oscillation frequency and to a pre-established relation between the frequency of oscillation and the theoretical cutoff frequency, in such a way as to confer upon the filtering device a cutoff frequency equal to the theoretical cutoff frequency to within a tolerance. After the adjustment phase, a working phase takes place in which the filtering device carries out its filtering function.

32 Claims, 3 Drawing Sheets

METHOD OF ADJUSTING THE CUTOFF FREQUENCY OF AN ELECTRONIC FILTERING SYSTEM, AND CORRESPONDING SYSTEM

FIELD OF THE INVENTION

The invention relates to electronic filtering systems and methods, and more particularly, to calibration or adjustment of the cutoff frequency in such systems.

BACKGROUND OF THE INVENTION

Electronic filtering systems are used in wireless communication systems, for example, and especially in cellular mobile telephones whose reception and transmission units incorporate filtering devices. In the reception circuits of cellular mobile telephones, after conversion of the high-frequency analog signal into a low-frequency signal, it is important to filter the low-frequency signal to only retain the useful information. In direct conversion receivers, this filtering is carried out by low-pass filters. Now, it is important to know the cutoff frequency with good accuracy. Also, in integrated systems, this cutoff frequency may vary by up to 30%, based upon the manufacturing process and the operating temperature.

This may then result, during the operation of the telephone, in a loss of the useful signal if the cutoff frequency decreases too greatly, or else in useful signal degradation due to poor rejection of jammers if the cutoff frequency increases too greatly. This is the reason why it is necessary to calibrate the filter, i.e. alter the cutoff frequency of the filter to a known value, in this instance the theoretical cutoff frequency, with greater accuracy.

At present, to perform this calibration, it is possible to use a phase-locked loop whose oscillator is embodied with elements analogous to those of the filter to be calibrated, in particular a resistive/capacitive network. The calibration of the filter is then performed by calibrating the oscillator, and by applying the same correction to the oscillator and to the filter, for example by switching some of the capacitors of the resistive/capacitive network. Now, there is always a matching error between the external phase-locked loop and the filter to be calibrated.

Consequently, the correction determined with regard to the phase-locked loop external to the filter, and applied to the filter itself, is not exact by reason of this matching error. Moreover, the presence of this matching error leaves very little margin for inaccuracy in the technological embodiment of the remainder of the integrated circuit, this being especially penalizing when the cutoff frequency has to be altered with a small tolerance, slightly greater than the matching error. Finally, the presence of an external phase-locked loop for the calibration increases the surface area of the integrated circuit, this having an impact on the cost of embodiment and on the overall size.

SUMMARY OF THE INVENTION

An object of the invention is to provide a filtering system whose calibration is not marred by any matching error. An object of the invention is also to provide a filtering system whose calibration constraint requires only a very small increase in the surface area of silicon.

These objects and others are provided by a method of controlling the operation of a monotonic-phase filtering device having a theoretical cutoff frequency. A monotonic-phase filtering device is, for example, a high-pass or a low-pass filter. According to the invention, this method of control comprises a calibration phase in which the filtering device is operated as an oscillator, the frequency of oscillation of the filtering device is determined, and the characteristics of the filtering device are corrected with respect to the determined oscillation frequency and to a pre-established relation between the frequency of oscillation and the theoretical cutoff frequency, in such a way as to confer upon the filtering device a cutoff frequency equal to the theoretical cutoff frequency to within a tolerance.

Moreover, the method of control comprises a working phase in which the filtering device carries out its filtering function. In other words, the invention provides for the use of the filtering device itself as an oscillator. Thus, no external device is used for calibration, and consequently any matching error between such an external device and the filtering device itself is eliminated.

When the filtering device has an order greater than or equal to 3, the filtering device is operated as an oscillator by providing a feedback loop to itself with a phase inversion. Specifically, when the order is greater than or equal to 3, the variation in the phase of the filter as a function of frequency is such that there is a frequency value for which the phase of the filter is equal to $+180°$ or $-180°$, this permitting its oscillation. Conversely, when the filtering device has an order less than 3, for example an order 2, the value of $180°$ or of $-180°$ can never be attained for whatever value of frequency. Consequently, to allow the oscillation of the filtering device, and consequently its calibration, an identical auxiliary filtering device is then advantageously connected in series with the filtering device. Also, the assembly formed by the two filtering devices is operated as an oscillator by feeding this assembly back to itself with phase inversion. This makes it possible to calibrate the filtering device.

When the input of the filtering device is virtual ground, i.e. when the filtering device is for example formed of an operational amplifier, the feedback is advantageously driven with a current injected onto the virtual ground of the filtering device, to alter the amplitude of the oscillations. Thus, the value of the current will advantageously be chosen in such a way that the filter works in the linear operating zone. When the cutoff frequency of the filtering device is defined by a resistive/capacitive network, the characteristics of the filtering device are advantageously corrected by modifying the capacitive value of the resistive/capacitive network.

An aspect of the invention is also an electronic filtering system, including a monotonic-phase filtering device having a theoretical cutoff frequency, and a first controllable means/unit connected to the filtering device and capable of being activated or deactivated in response to a control signal, in such a way as to operate the filtering device as an oscillator when they are activated. The filtering device carries out its filtering function when the first means/unit is deactivated. The system also includes measurement means/unit to determine the frequency of oscillation of the filtering device, correction means/unit to correct the characteristics of the filtering device with respect to the determined oscillation frequency and to a pre-established relation between the frequency of oscillation and the theoretical cutoff frequency, in such a way as to confer upon the filtering device a cutoff frequency equal to the theoretical cutoff frequency to within a tolerance, and a control means/unit to deliver the control signal.

According to an embodiment in which the filtering device has an order greater than or equal to 3, the first means/unit comprises a stage for feedback with phase inversion connected between the output and the input of the filtering device.

According to an embodiment in which the filtering device has an order less than 3, the first means/unit comprises a stage for feedback with phase inversion connected between the output and the input of the filtering device, this feedback stage comprising an auxiliary filtering device identical to the filtering device, and the two filtering devices being connected in series.

According to an embodiment of the invention, the input of the filtering device is a virtual ground and the feedback stage comprises means/unit to drive the feedback with a current in such a way as to alter the amplitude of the oscillations.

According to an embodiment, the filtering device exhibits a differential structure and comprises a differential operational amplifier, and in that the drive means/unit comprises a differential pair of transistors, for example, field-effect transistors with insulated gates whose respective sources or emitters are linked, whose respective gates or bases are linked to the two outputs of the differential amplifier, and whose respective drains or collectors are linked to the two inputs of the differential amplifier, and a current source capable of being activated or deactivated in response to the control signal, and connected to the sources of the two transistors.

The invention is also directed to a remote terminal of a wireless communication system, for example a cellular mobile telephone, incorporating a filtering system as defined herein.

BRIEF DESCRIPTION OF THE DRAWINGS

Other advantages and characteristics of the invention will become apparent on examining the detailed description of embodiments and modes of implementation, which are non-limiting, and of the appended drawings, in which.

DETAILED DESCRIPTION OF THE PREFERRED EMBODIMENTS

Figure 1:
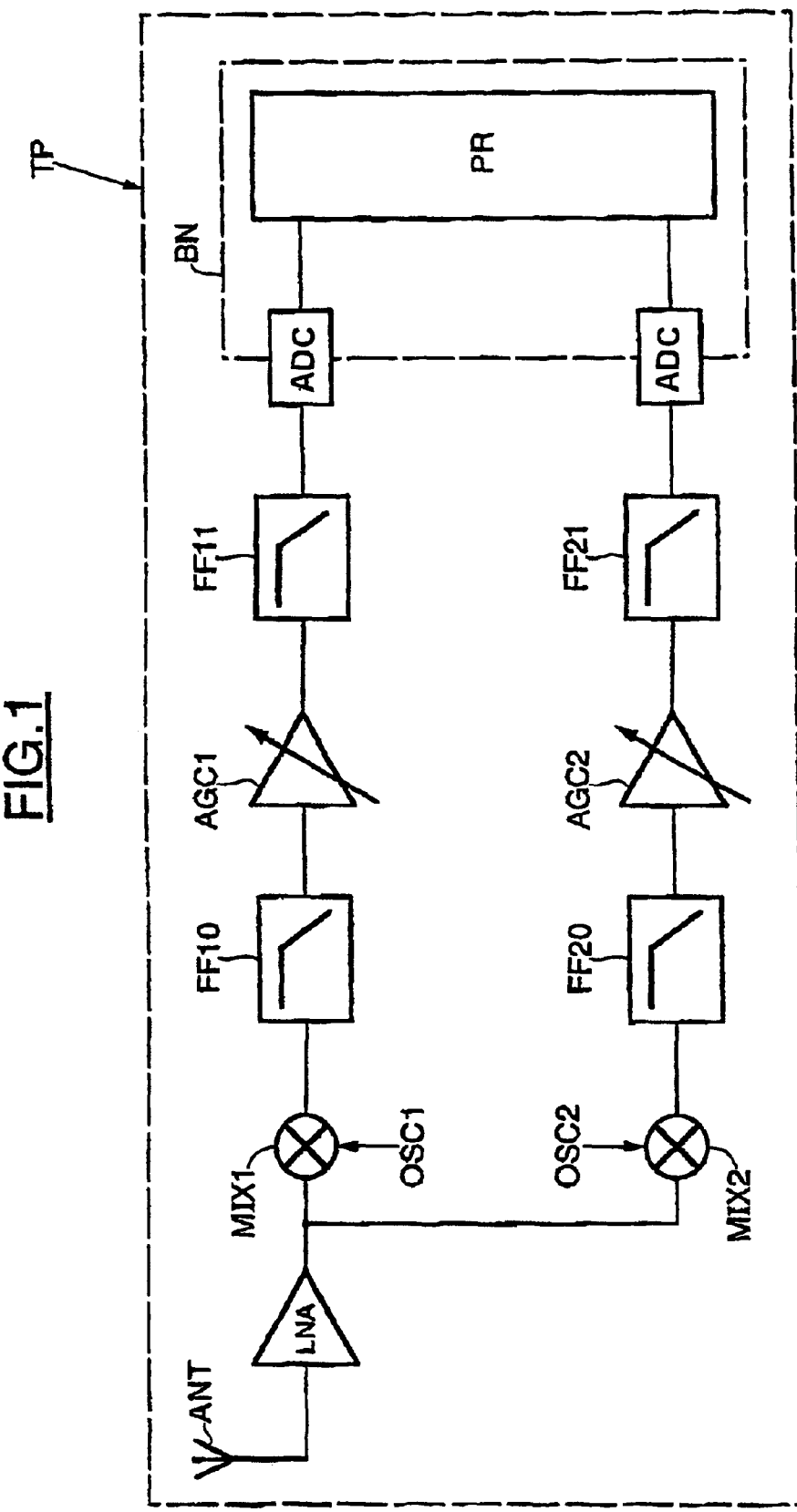
FIG. 1 is a schematic diagram illustrating a reception chain of a cellular mobile telephone incorporating a filtering system according to the invention.

In FIG. 1, the reference TP denotes a cellular mobile telephone comprising, in a conventional manner, an antenna ANT followed by a reception chain comprising at the head end a low noise amplifier LNA. Downstream of the amplifier LNA, are connected two mixers MIX1, MIX2, respectively receiving two local oscillator signals, mutually phase shifted by 90°, and respectively referenced OSC1 and OSC2. These two mixers perform a baseband transposition of the signal emanating from the amplifier LNA. This is known as a direct conversion receiver or zero intermediate frequency receiver. The two processing channels are then in phase quadrature and are respectively known as the "I channel" and "Q channel" by the person skilled in the art.

In a conventional manner, each processing channel comprises a controlled-gain amplifier AGC1, AGC2, flanked by low-pass filters FF10 and FF10 on one hand, and FF20 and FF21, on the other hand. The analog reception chain terminates with an analog/digital conversion stage ADC which forms the input of a digital processing block BN. The processing block BN includes at least processing means such as a processor PR, performing the demodulation as well as conventional channel decoding processing.

Figure 2:
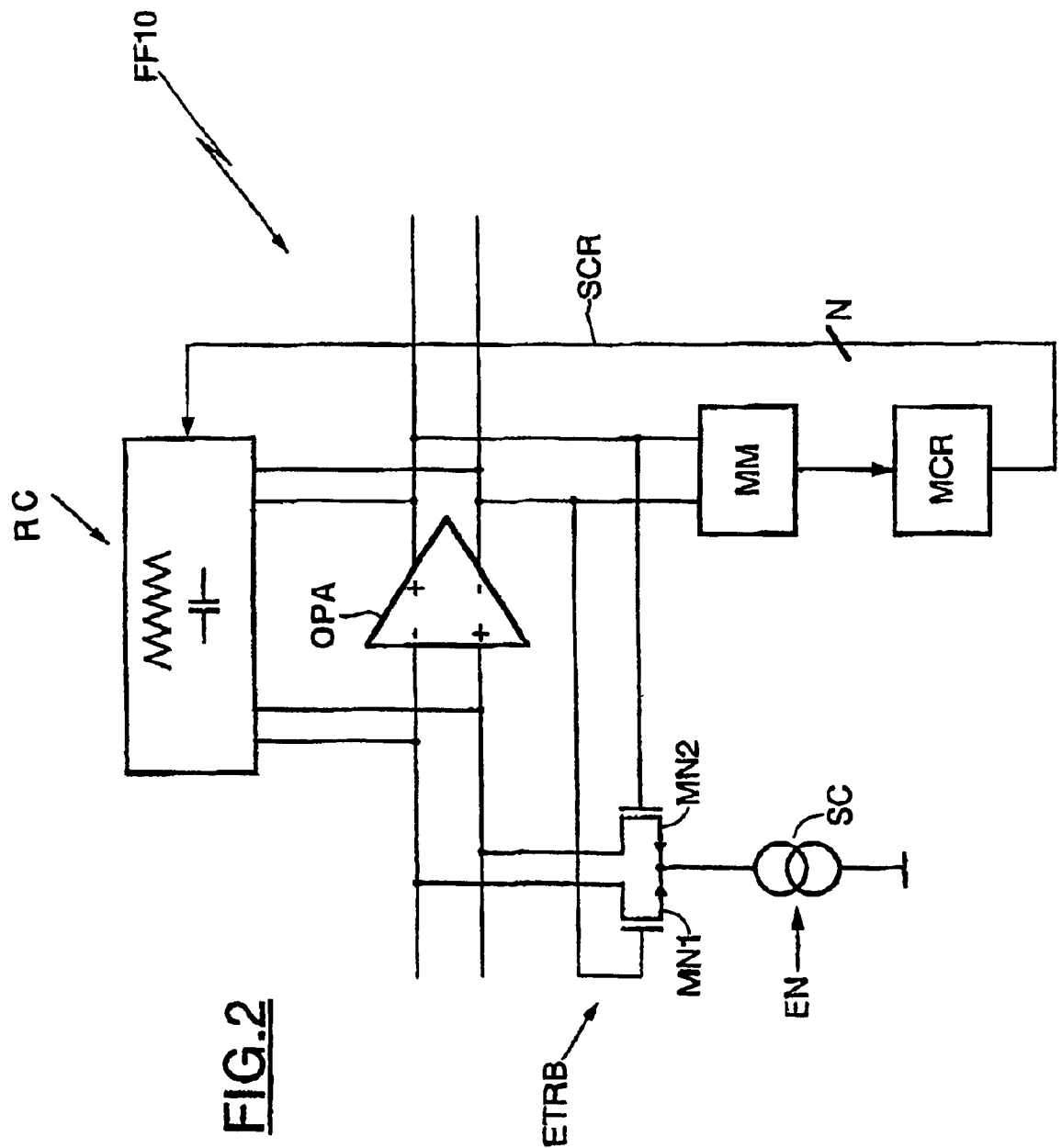
FIG. 2 is a schematic diagram illustrating in greater detail, an embodiment of a filtering system according to the invention.

One of the filtering systems, in this instance the filtering system FF10, will now be described with reference to FIGS. 2 and 3., it being understood of course that the other filtering systems have an identical structure. Represented in FIG. 2 is a differential structure, it being understood of course that the invention applies also to a structure with single input. The filtering system FF10, advantageously embodied in integrated fashion on a silicon chip, comprises a filtering device, here formed of an active filter, comprising a differential operational amplifier OPA associated in a conventional manner with a resistive/capacitive network RC making it possible to define its cutoff frequency.

The filtering device is fed back to itself by a feedback stage ETRB, here comprising a transducer formed of a differential pair of field-effect transistors with insulated gates (MOS transistors) for example N-channel type, and respectively referenced MN1 and MN2, as well as a current source SC, which may be activated or deactivated by a control signal EN. More precisely, the respective gates of the transistor MN1 and MN2 are linked to the two outputs of the operational amplifier OPA, while the respective drains of these transistors are linked to the two inputs of the amplifier OPA. The sources of the two transistors are together linked to the output of the current source SC.

It is assumed here that the order of the filter is greater than or equal to 3, for example equal to 4. Consequently, the chart representing the monotonic variation of the phase of the filter as a function of frequency, exhibits a frequency point for which the phase of the low-pass filter passes through −180°. Consequently, this filter is capable of oscillating when it is, for example, fed back to itself with a phase inversion. Although this feedback with phase inversion may be performed directly between the output and the input of the operational amplifier, it is preferable to adopt the arrangement illustrated in FIG. 2, in which the differential pair of MOS transistors carries out a phase inversion.

Moreover, the input of the filter, i.e. in this instance the differential input of the operational amplifier OPA being a virtual ground, i.e. one exhibiting a very high input impedance, this input can be driven with the current delivered by the current source SC, doing so without modifying the characteristic of the filter. The value of the current delivered by the current source SC makes it possible to determine the amplitude of the oscillation of the filter. This value of current will be chosen in such a way that the filter works in the linear operating zone.

The oscillation will be sustained by injecting the current delivered by the current source SC, alternately into the two branches of the differential pair of MOS transistors. The invention uses here, in particular, the fact that a filter of order n is out of phase with the cutoff frequency by $n\pi/4$. In other words, when the filter has an order equal to 4, for example, it is $+/-\pi$ out of phase with the cutoff frequency. Stated otherwise, the frequency of oscillation of the filter is then theoretically its cutoff frequency.

The filtering system, according to the invention, then comprises a measurement device or means MM to determine the frequency of oscillation of the filter, and a correction unit or means MCR to correct the characteristics of the filtering device, i.e. in this instance, the capacitive value of the capacitive network RC, with respect to the determined oscillation frequency and to a pre-established relation between the frequency of oscillation and the theoretical cutoff frequency, in such a way as to confer upon the filtering device a cutoff frequency equal to the theoretical cutoff frequency to within a tolerance.

Figure 3:
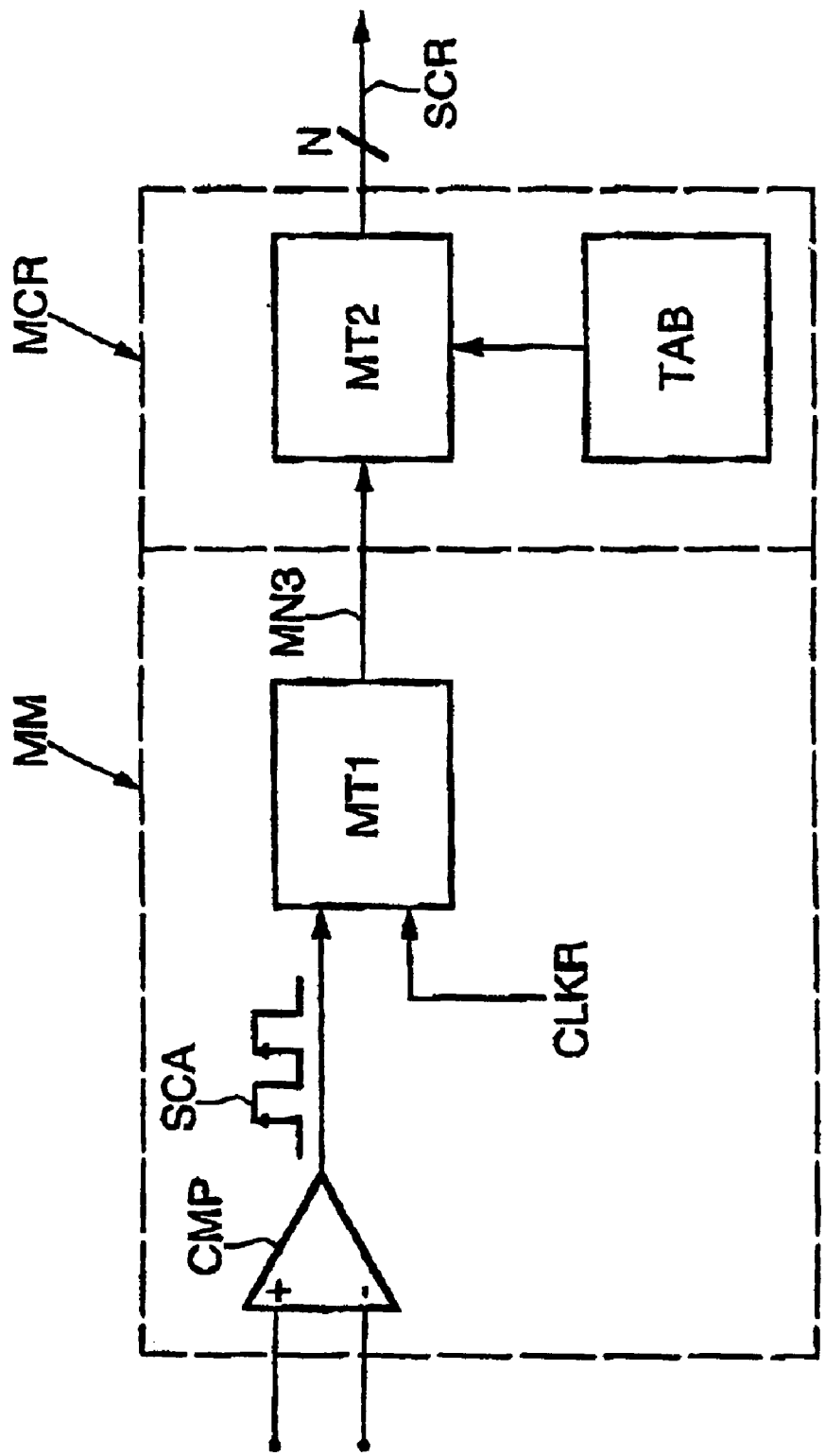
FIG. 3 is a schematic diagram illustrating, in greater detail, a part of the filtering system of FIG. 2.

One embodiment of the measurement device or means MM and of the correction unit or means MCR is diagrammatically illustrated in FIG. 3. Thus it may be seen that the measurement device or means MM comprises, for example, at the head end a comparator CMP connected to the two outputs of the operational amplifier OPA. This comparator CMP performs a shaping of the output signal and delivers a square signal SCA. A first processor or processing means MT1 receives, on the one hand, the signal SCA and, on the other hand, a reference clock signal CLKR, and will count the number of periods of the reference clock signal CLKR between two successive rising edges of the signal SCA. This will make it possible to determine the oscillation frequency. In practice, the output signal delivered by the processor or processing means MT1, which may for example be embodied as a counter and logic gates, is a digital word MN3, for example of 9 bits, which is representative of the ratio of the oscillation frequency to the frequency of the reference clock signal.

The correction unit or means MCR comprises, for example, a memory storing a pre-established correction table TAB defining, with respect to the order of the filter and its theoretical cutoff frequency, the correction to be made in respect of each word MN3 received at the input of a second processor or processing means MT2. In practice, the second processor or processing means comprises a logical addressing unit or means which will address the memory TAB with each word MN3 received so as to extract therefrom a correction word SCR on N bits (4, for example). This word SCR will then be delivered to the resistive/capacitive network RC so as to switch or otherwise modify a certain number of capacitors of this RC network, in such a way as to modify or otherwise change the capacitive value of this RC network as a function of the correction word SCR. The frequency of oscillation of the filter will thus be able to be altered, in such a way as to approximate the theoretical cutoff frequency to within a tolerance.

When this calibration phase is terminated, a control unit or means which may, for example be incorporated within the baseband processor PR, then deactivates the current source SC via the signal EN. Therefore, the filtering device no longer oscillates and carries out its filtering function. In this regard, it should be noted that when the current source SC is deactivated, the operational amplifier OPA remains fed back via the gate/drain capacitances of the MOS transistors MN1 and MN2. Therefore, and so as not to disturb the filtering function by this feedback, MOS transistors of small size will advantageously be chosen to minimize the value of the gate/drain capacitances. The person skilled in the art will be able to dimension the MOS transistors MN1 and MN2 in this regard, in such a way as not to disturb the filtering device in its filtering function by possible feedback of the filtering signal via the gate/drain capacitances.

As a variation, it would be possible to supplement this embodiment with a stage of the cascode type between the MOS transistors MN1 and MN2 and the inputs of the operational amplifier OPA, in such a way as to effect in the working phase of the filter, insulation with regard to the gate/drain capacitances of the MOS transistors MN1 and MN2.

In practice, when the filtering system is incorporated into a cellular mobile telephone for example, the calibration phase will advantageously be performed when the cellular mobile telephone is powered up, and possibly subsequently in response to a control signal delivered by the baseband processor PR. The invention is not limited to the embodiments and modes of implementation just described, but encompasses all variations thereof. Thus, if the order of the filter is equal to 4 or is a multiple of 4, the filter oscillates at its cutoff frequency. This is not the case when the order of the filter, while still being greater than or equal to 3, is different from 4 or from a multiple of 4. In this case, the filter oscillates at a frequency which differs from the cutoff frequency and depends on the quality factor of the filter. This quality factor being known, it should then be taken into account in the correction table TAB contained in the memory of the correction means.

If the order of the filter is less than 3, for example equal to 2, another filter identical to the filter to be calibrated will then be placed for the calibration phase in series with this filter to be calibrated. In practice, in the case of a cellular mobile telephone for example, since two processing paths I and Q are available, the two homologous filters situated respectively on the two I and Q processing pathways, for example the filters FF10 and FF20, will advantageously be connected in series, in the calibration phase. This assembly of two filters will then be fed back to itself via the feedback state ETRB, for example, in such a way as to oscillate. The two filters will then be calibrated simultaneously. Moreover, to facilitate the startup of the oscillation, provision may be made to temporarily connect to one of the drains of the transistors MN1 and MN2, an additional current source injecting an additional current into one of the branches of the differential pair on startup, in such a way as to unbalance the system and thus promote the startup of the oscillation.

The invention has moreover been described here with a so-called "low-pass" filter. Of course, it may be applied to a filter of "high-pass" type. The invention may also be applied in succession to a high-pass filter and to a low-pass filter, connected in series and together forming a bandpass filter. Finally, although a filter with a resistive/capacitive network has been described here, the invention applies also to a filter having an inductive/capacitive network.

What is claimed is:

1. A method of controlling the operation of a monotonic-phase filtering device having a theoretical cutoff frequency, the method comprising:

operating the filtering device as an oscillator in a calibration phase;

determining the frequency of oscillation of the filtering device;

adjusting characteristics of the filtering device with respect to the determined frequency of oscillation and to a pre-established relation between the frequency of oscillation and the theoretical cutoff frequency, in such a way as to confer upon the filtering device a cutoff frequency equal to the theoretical cutoff frequency to within a certain tolerance; and operating the filtering device in an operational phase in which the filtering device performs a filtering function.

2. The method according to claim 2, wherein the filtering device has an order greater than or equal to three, and is operated as an oscillator by providing a feedback loop with a phase inversion.

3. The method according to claim 2, wherein an input of the filtering device is a virtual ground, and the feedback loop is driven with a current injected onto the virtual ground in such a way as to alter the amplitude of the oscillations.

4. The method according to claim 1, wherein the filtering device has an order less than three, and is operated as an oscillator by connecting an auxiliary filtering device in series with the filtering device, and providing the series connected filtering devices with a feedback loop with a phase inversion.

5. The method according to claim 4, wherein an input of the filtering device is a virtual ground, and the feedback loop is driven with a current injected onto the virtual ground in such a way as to alter the amplitude of the oscillations.

6. The method according to claim 1, wherein the cutoff frequency of the filtering device is defined by a resistive/capacitive network, and the characteristics of the filtering device are adjusted by modifying a capacitive value of the resistive/capacitive network.

7. A method of controlling the operation of a filter having a theoretical cutoff frequency, the method comprising:
calibrating the filter by
operating the filter as an oscillator,
determining the frequency of oscillation of the filter,
adjusting characteristics of the filter with respect to the determined frequency of oscillation and the theoretical cutoff frequency to set a cutoff frequency substantially equal to the theoretical cutoff frequency; and
operating the filter as a filter.

8. The method according to claim 7, wherein the filter has an order greater than or equal to three, and is operated as an oscillator by providing a feedback loop with a phase inversion.

9. The method according to claim 8, wherein an input of the filter is a virtual ground, and the feedback loop is driven with a current injected onto the virtual ground to alter the amplitude of the oscillations.

10. The method according to claim 7, wherein the filter has an order less than three, and is operated as an oscillator by connecting an auxiliary filter in series with the filter, and providing the series connected filters with a feedback loop with a phase inversion.

11. The method according to claim 10, wherein an input of the filter is a virtual ground, and the feedback loop is driven with a current injected onto the virtual ground to alter the amplitude of the oscillations.

12. The method according to claim 7, wherein the cutoff frequency of the filter is defined by a resistive/capacitive network, and the characteristics of the filter are adjusted by modifying a capacitive value of the resistive/capacitive network.

13. An electronic filtering system comprising:
a monotonic-phase filtering device having a theoretical cutoff frequency;
controllable means connected to the filtering device and controlled by a control signal to selectively operate the filtering device as an oscillator and a filter;
measurement means for determining a frequency of oscillation of the filtering device; and
correction means for adjusting characteristics of the filtering device with respect to the determined frequency of oscillation and to the theoretical cutoff frequency to set a cutoff frequency substantially equal to the theoretical cutoff frequency.

14. The system according to claim 13, wherein the filtering device has an order greater than or equal to three, and the controllable means comprises a phase inversion feedback stage connected between an output and an input of the filtering device.

15. A system according to claim 14, wherein the input of the filtering device is a virtual ground, and the feedback stage comprises driving means for driving the feedback stage with a current injected onto the virtual ground to alter an amplitude of the oscillations.

16. A system according to claim 15, wherein the filtering device defines a differential structure and comprises a differential operational amplifier; and wherein the driving means comprises:
a differential pair of transistors having first conduction terminals connected together, control terminals connected to outputs of the differential operational amplifier, and second conduction terminals connected to inputs of the differential amplifier; and
a current source controlled by the control signal, and connected to the first conduction terminals of the differential pair of transistors.

17. A system according to claim 13, wherein the filtering device has an order less than three, and the controllable means comprises a phase inversion feedback stage connected between an output and an input of the filtering device, the phase inversion feedback stage comprising an auxiliary filtering device connected in series with the filtering device.

18. A system according to claim 17, wherein the input of the filtering device is a virtual ground, and the feedback stage comprises driving means for driving the feedback stage with a current injected onto the virtual ground to alter an amplitude of the oscillations.

19. A system according to claim 18, wherein the filtering device defines a differential structure and comprises a differential operational amplifier; and wherein the driving means comprises:
a differential pair of transistors having first conduction terminals connected together, control terminals connected to outputs of the differential operational amplifier, and second conduction terminals connected to inputs of the differential amplifier; and
a current source controlled by the control signal, and connected to the first conduction terminals of the differential pair of transistors.

20. A system according to claim 13, wherein the filtering device comprises a resistive/capacitive network defining the cutoff frequency, and the correction means correct the characteristics of the filtering device by modifying a capacitive value of the resistive/capacitive network.

21. An electronic filtering system comprising:
a filter having a theoretical cutoff frequency;
a controller connected to the filtering device and controlled by a control signal to selectively operate the filter as an oscillator and a filter;
a measurement unit to determine a frequency of oscillation of the filter; and
a correction unit to adjust characteristics of the filter with respect to the determined frequency of oscillation and to the theoretical cutoff frequency to set a cutoff frequency substantially equal to the theoretical cutoff frequency.

22. The system according to claim 21, wherein the filter has an order greater than or equal to three, and the controller comprises a phase inversion feedback stage connected between an output and an input of the filter.

23. A system according to claim 22, wherein the input of the filter is a virtual ground, and the feedback stage comprises a driver to drive the feedback stage with a current injected onto the virtual ground to alter an amplitude of the oscillations.

24. A system according to claim 23, wherein the filter defines a differential structure and comprises a differential operational amplifier; and wherein the driver comprises:

a differential pair of transistors having first conduction terminals connected together, control terminals connected to outputs of the differential operational amplifier, and second conduction terminals connected to inputs of the differential amplifier; and a current source controlled by the control signal, and connected to the first conduction terminals of the differential pair of transistors.

25. A system according to claim 21, wherein the filter has an order less than three, and the controller comprises a phase inversion feedback stage connected between an output and an input of the filter, the phase inversion feedback stage comprising an auxiliary filter connected in series with the filter.

26. A system according to claim 25, wherein the input of the filter is a virtual ground, and the feedback stage comprises a driver for driving the feedback stage with a current injected onto the virtual ground to alter an amplitude of the oscillations.

27. A system according to claim 26, wherein the filter defines a differential structure and comprises a differential operational amplifier; and wherein the driver comprises:

a differential pair of transistors having first conduction terminals connected together, control terminals connected to outputs of the differential operational amplifier, and second conduction terminals connected to inputs of the differential amplifier; and a current source controlled by the control signal, and connected to the first conduction terminals of the differential pair of transistors.

28. A system according to claim 21, wherein the filter comprises a resistive/capacitive network defining the cutoff frequency, and the correction unit corrects the characteristics of the filter by modifying a capacitive value of the resistive/capacitive network.

29. A wireless communications device comprising:

an electronic filtering system including a filter having a theoretical cutoff frequency, a controller connected to the filtering device and controlled by a control signal to selectively operate the filter as an oscillator and a filter, a measurement unit to determine a frequency of oscillation of the filter, and a correction unit to adjust characteristics of the filter with respect to the determined frequency of oscillation and to the theoretical cutoff frequency to set a cutoff frequency substantially equal to the theoretical cutoff frequency.

30. The device according to claim 29, wherein the filter has an order greater than or equal to three, and the controller comprises a phase inversion feedback stage connected between an output and an input of the filter.

31. A device according to claim 29, wherein the filter has an order less than three, and the controller comprises a phase inversion feedback stage connected between an output and an input of the filter, the phase inversion feedback stage comprising an auxiliary filter connected in series with the filter.

32. A device according to claim 29, wherein the filter comprises a resistive/capacitive network defining the cutoff frequency, and the correction unit corrects the characteristics of the filter by modifying a capacitive value of the resistive/capacitive network.

* * * * *

UNITED STATES PATENT AND TRADEMARK OFFICE
CERTIFICATE OF CORRECTION

PATENT NO.     : 6,816,006 B2
DATED          : November 9, 2004
INVENTOR(S)    : Ravatin et al.

It is certified that error appears in the above-identified patent and that said Letters Patent is hereby corrected as shown below:

Column 3,
Line 65, delete "FF10 and FF10" insert -- FF10 and FF11 --

Column 6,
Line 60, delete "claim 2" insert -- claim 1 --

Signed and Sealed this

Twenty-sixth Day of April, 2005

JON W. DUDAS
*Director of the United States Patent and Trademark Office*